Feb. 10, 1942.    S. SQUILLER    2,272,926
PUMP
Filed Jan. 26, 1939    2 Sheets-Sheet 2
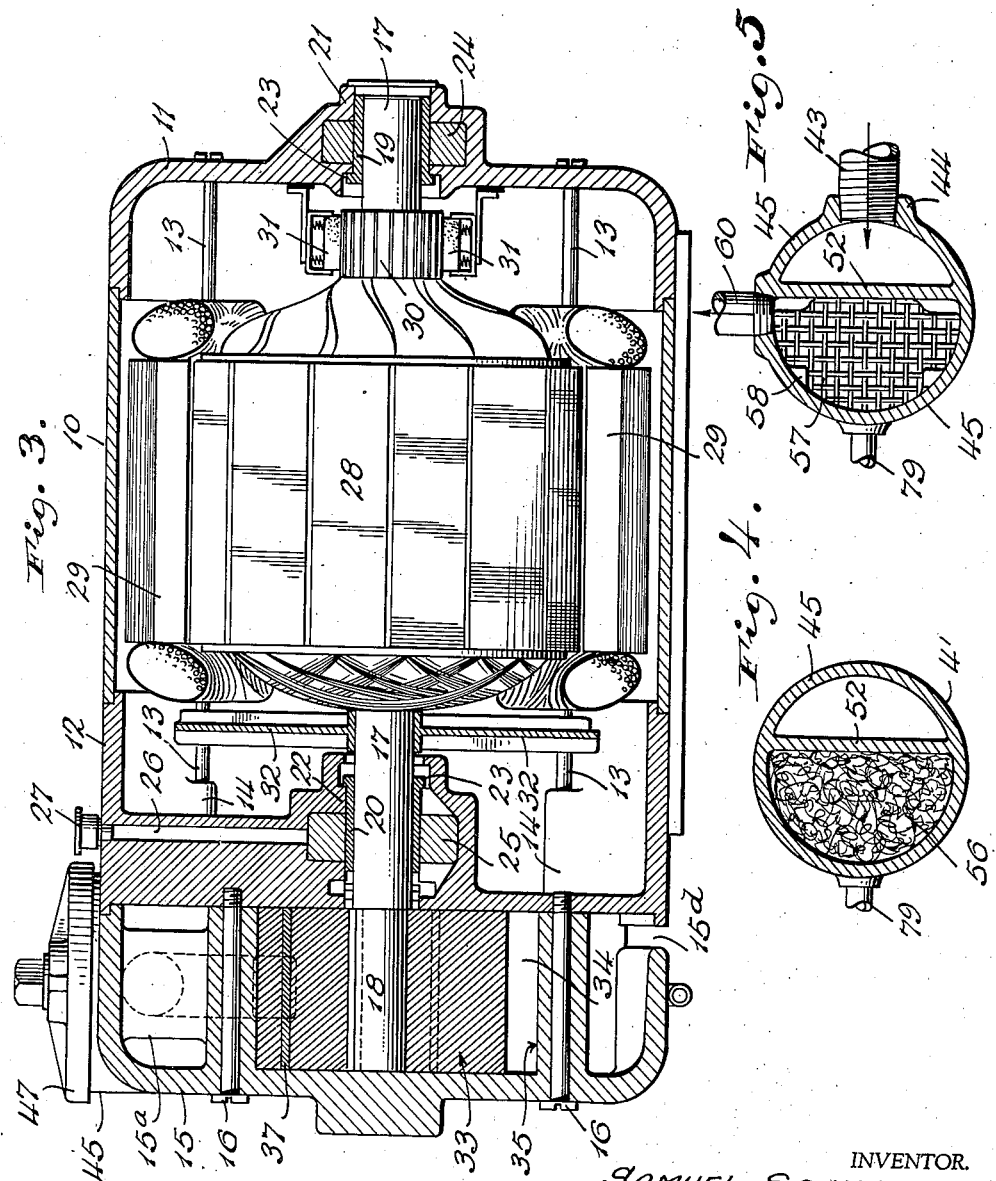
INVENTOR.
SAMUEL SQUILLER
BY
ATTORNEY.

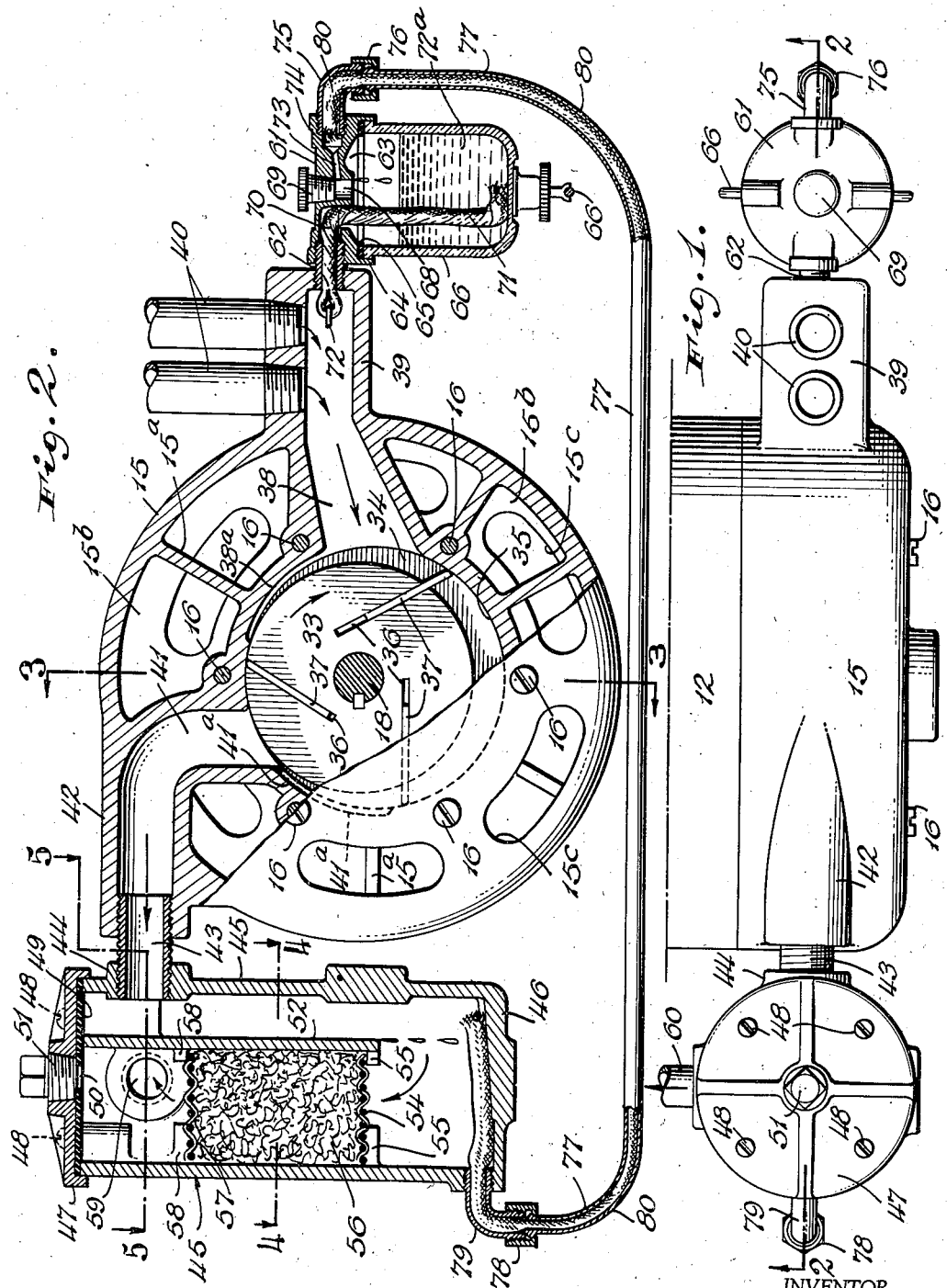

Patented Feb. 10, 1942

2,272,926

UNITED STATES PATENT OFFICE 2,272,926

PUMP

Samuel Squiller, Pittsburgh, Pa., assignor to New Jersey Machine Corporation, Hoboken, N. J., a corporation of New Jersey Application January 26, 1939, Serial No. 252,888

9 Claims. (Cl. 230—207)

The invention relates to pumps and more particularly to pumps arranged to function as compressors or exhausters, and has for its object to provide a compact self-contained unit consisting of motor and pump constructed and arranged in a novel manner to provide a constant vacuum or pressure without pulsation or vibration. The invention contemplates further a novel and automatic oiling system incorporated in said unit to provide simple and adequate lubrication under all operative conditions and so as to visibly show the amount of oil circulating through the pump. Another object of the invention is to provide a pump constructed in a manner to deliver compressed air of maximum cleanliness and to develop a vacuum which is constant and without material fluctuation for a given period. Other more specific objects will appear from the description hereinafter and the features of novelty will be pointed out in the claims.

In the accompanying drawings, which illustrate an example of the invention without defining its limits, Fig. 1 is a plan view of the novel apparatus; Fig. 2 is a sectional view partly in elevation substantially on the line 2—2 of Fig. 1; Fig. 3 is a section on the line 3—3 of Fig. 2; Fig. 4 is a detail horizontal section on the line 4—4 of Fig. 2, and Fig. 5 is a similar view on the line 5—5 of Fig. 2.

The apparatus comprises a self-contained unit consisting, in the illustrated example, of a cylindrical section 10, an end bracket or cap 11 fitted upon one end of the section 10, and a motor bracket section 12 fitted upon the opposite end of the cylindrical section 10 as shown in Fig. 3. The cylindrical section 10, the end bracket or cap 11 and the motor bracket section 12 are fastened together in axial registration in any suitable manner, to constitute the motor casing of the pump; for instance, as illustrated in Fig. 3, the section 10, cap 11 and bracket 12 may be detachably connected by means of screw-bolts 13 bearing against the end wall of the cap 11 and threaded into lugs 14 formed interiorly of the bracket section 12 preferably as integral parts thereof. The aforesaid self-contained unit further includes a cylinder or rotor housing 15 which is fastened to the bracket section 12 in external axial alignment therewith, for instance, by screw-bolts 16 so as to be readily detachable at will as may be required.

A shaft 17 extends lengthwise of the motor casing and outwardly beyond the bracket section 12 in the form of an end portion 18 into the cylinder or rotor housing 15 as shown in Fig. 3.

At one end and at an intermediate point, the shaft 17 is provided with bearing bushings 19 and 20 suitably fixed in place on said shaft 17 and journalled in bearings 21 and 22 forming parts respectively of the end bracket or cap 11 and the motor bracket section 12. As shown in Fig. 3, the end portion 18 of the shaft 17 simply projects freely into the cylinder or rotor housing 15 and is not journalled therein; in other words, the bearings 21 and 22 in the motor casing 10, 11, 12 are relied upon to rotatably support the end portion 18 of the shaft 17 in the cylinder or rotor housing 15. The shaft 17 and its end portion 18 are held against axial displacement by means of annular flanges 23 forming parts of the bushings 19 and 20, and engaging the bearings 21 and 22 respectively. For purposes of lubrication, packings 24 and 25 surround the respective bushings 19 and 20, the packing 25 being periodically supplied with lubricating oil through an oil channel 26 located in the motor bracket section 12 and normally closed by means of a removable cap or closure 27 of suitable type; the packing 24 may be of the self-lubricating type or it may be supplied with oil at intervals in any well-known manner. Within the cylindrical section 10 the shaft 17 carries a conventional armature 28 surrounded in the well-known way by the usual field magnets 29 carried by the cylindrical section 10 of the motor casing in any customary manner. In addition, the shaft 17 may carry a commutator 30 engaged by suitable brushes 31 mounted in the end bracket or cap 11 for instance as shown in Fig. 3, it being understood that the motor, in addition may include any additional elements commonly found in conventional electric motors; in the instant apparatus the electric motor per se except for its arrangement in the self-contained unit, forms no part of the invention, as any well-known and existing type of electric motor suitable for the purpose may be used. For the purpose of cooling the windings of the electric motor, a cooling device such as a fan 32 may be mounted on the shaft 17 for instance as illustrated in Fig. 3.

A cylinder or rotor 33 is keyed or otherwise fixed upon the end portion 18 of the shaft 17 and is dimensioned axially to snugly fit between the end face of the housing 15 and the opposed face of the motor bracket section 12 as shown in Fig. 3. The cylinder or rotor 33 is located in a chamber 34 formed interiorly of the housing 15 and having a circular wall 35 in eccentric relation to the axis of rotation of the cylinder or rotor 33 as illustrated in Fig. 2. The cylinder or rotor 33 is provided with a plurality of slots 36 preferably arranged in tangential relation to the axis of rotation thereof, for slidably accommodating vanes 37 arranged in intimate engagement with the circular wall 35 of the chamber 34. The housing 15 is provided with ribs 15a extending diagonally at spaced intervals between the outer shell of said housing 15 and the wall of the chamber 34 to form air passages 15b which communicate with openings 15c in said housing 15 as shown in Fig. 2; in addition, the housing 15 includes an aperture or slot 15d at its lower portion as illustrated in Fig. 3.

A passage 38 formed within the housing 15 communicates with the chamber 34 and extends into an extension 39 projecting outwardly from said housing 15 and provided with one or more threaded apertures into which the ends of pipes 40 are threaded as shown in Fig. 2. The housing 15 further includes an interior channel 41 communicating with the chamber 34 and terminating in a boss 42 into which one end of a coupling tube 43 is threaded as illustrated in Fig. 2. The opposite end of the coupling tube 43 is threaded into an apertured boss 44 formed on an oil and air separator 45, the arrangement being such that the tube 43 establishes communication with the interior of the chamber 34 through the channel 41, and the interior of the separator 45. In the preferred construction, bleeder channels 38a and 41a are formed in the circular wall 35 of the chamber 34; as shown in Fig. 2 the channel 38a extends circumferentially of the chamber 34 from the passage 38 to a point distant therefrom, while the channel 41a similarly extends from the interior channel 41 to a point distant therefrom, both channels 38a and 41a extending in directions opposite to the direction of rotation of the cylinder or rotor 33 and its vanes 37. The purpose of the channels 38a and 41a is to avoid sudden changes in the development of suction and pressure to thereby reduce operative noises to a minimum.

The oil or air separator 45, as shown in Fig. 1, may be of cylindrical form and has its lower end permanently closed by a bottom 46 and its upper open end normally closed by means of a suitable cap 47 removably fixed in place in any convenient manner as by screws 48; preferably a conventional gasket 49 is located between the cap 47 and the upper end of the oil or air separator 45 to provide an air and fluid tight connection at this point. The gasket 49 includes an aperture 50 in registry with an opening in the cap 47 normally closed by means of a stopper or the like 51; to provide for the easy removal and replacement of the latter at will, said stopper 51 may be threaded into the opening in said cap 47 and provided with a rectangular head 51a as illustrated in Fig. 2 for the accommodation of a suitable tool such as a wrench.

As shown in Figs. 4 and 5, a partition web 52 extends across the condenser 45 and downwardly from the upper end thereof to a point at a distance above the bottom 46 of said oil or air separator 45; as illustrated in Fig. 2 the arrangement is such that the web 52 at its upper portion is located opposite and in spaced relation to the one end of the coupling 43 to constitute a baffle plate for the purpose to be more fully set forth hereinfter. In addition, the web 52 provides an auxiliary chamber 53 within the oil and air separator 45, said auxiliary chamber 53 at its lower end being in communication with the interior of the separator 45.

A foraminous support exemplified by a wire screen 54 is located at the lower end of the auxiliary chamber 53 and is supported in place in any suitable manner as by lugs 55 formed on the interior surface of the oil and air separator 45 and on the web 52 respectively. The screen 54 constitutes a rest for suitable filtering material 56 such as steel wool or any equivalent substance capable of removing oil and other impurities from air passing therethrough. The filtering material 56 is confined in the auxiliary chamber 53 by a second wire screen 57 or its equivalent, in co-operation with the lugs 58 similar to the lugs 55. The oil and air separator 45 is further provided with an opening 59 communicating with the interior of the auxiliary chamber 53 at the upper part thereof and preferably at a point above the second screen 57 or in other words, above the filtering material 56. A pipe 60 leads from the opening 59 to the point at which the compressed air is to be utilized.

In addition to the parts so far described, the apparatus includes a novel lubricating system which as shown in the drawings comprises a supporting bracket 61 attached by means of a threaded tubular nipple 62 to the extension 31 of the cylinder or rotor housing 15. The bracket 61 includes a recess 63 and an annular depending flange 64 forming a seat in which a gasket 65 is located for engagement by the upper open end of an oil reservoir preferably consisting of a transparent cup 66 which is removably secured in the aforesaid seat in any convenient manner as by means of a conventional locking bail 67 and associated elements, as illustrated in Fig. 2. The bracket 61 is provided with a central opening 68 opening inwardly to the cup 66 and normally closed by means of a suitable cap or stopper 69 preferably arranged to be easily removable at will.

The nipple 62, in addition to mounting the bracket 61 on the extension 31 establishes communication between the passage 38 and a channel 70 formed in the bracket 61 and opening downwardly therein into the recess 63 and accordingly communicating with the interior of the oil cup 66 as shown in Fig. 2. A suitable wick 71 extends through the nipple 62 with its one end located within the channel 38 and preferably formed with a loop in which a ring or the like 72 is mounted; the wick 71 passes through the channel 70 and downwardly into the oil cup 66 with its end resting upon the bottom of said cup 66, so that a portion of said wick 71 is submerged in the lubricating oil 72a contained in the cup 66 as illustrated in Fig. 2.

Interiorly the bracket 61 is further provided with a passage 73 leading from the central opening 68 to a chamber 74 which is internally threaded for receiving the one threaded end of a tubular elbow 75; the other end of the latter is externally threaded for the accommodation of a coupling nut 76 whereby one end of a metallic or other suitable tube 77 is connected with said elbow 75. The other end of the tube 77 is attached by means of a coupling nut 78 with a tubular elbow 79 which is threaded into an opening located at the lower end of the condenser 45, the arrangement being such that the elbow 79 communicated with the interior of said oil and air separator 45 in contiguous relation to the inner surface of the bottom 46 thereof; the said inner surface of said bottom 46 preferably slopes downwardly toward the elbow 79 and is constructed to constitute a shallow basin at the lower end of said oil and air separator 45 for the purpose to be more fully set forth hereinafter. A wick 80 has its one end resting upon the bottom 46 in the aforesaid shallow basin and extends through the tube 77 with its opposite end terminating and located in the chamber 74 of the bracket 61 as shown in Fig. 2; the arrangement is such that the tube 77 constitutes a confining and protecting sheath for a major portion of the wick 80.

In describing the operation of the pump, it will be assumed that the apparatus is being used as a compressor for delivering air under pressure to a point of use, it being understood that connection with a source of electricity in any convenient manner, as by inserting a conventional plug into an electrical outlet in the customary way serves to provide electric current for operating the motor and the shaft 17 with its extension 18. A suitable switch may be conveniently located for controlling the electric current to start and stop the motor at will. With the electric circuit closed, the armature 28 will be electrically actuated to rotate the shaft 17 and its end portion 18 to thereby correspondingly rotate the cylinder or rotor 33 in the chamber 34. Because of the eccentric relation of said rotor 33 to the circular wall of said chamber 34, the vanes 37 will be slidably reciprocated in the slots 36 and air will be drawn through the pipes 40 into the passage 38 and from the latter into the chamber 34. By the action of said vanes 37 and because of the aforesaid eccentric position of the rotor 33 in the chamber 34, the air will be compressed in its travel therein from the passage 38 to the channel 41 and accordingly will be delivered under pressure through the latter to the interior of the oil and air separator 45. During these operations, the bleeder channels 38a and 41a will function, as previously mentioned herein to reduce operative noises to a minimum. As the air is drawn into that part of the passage 38 located in the extension 39 oil which has been raised by capillary attraction through the wick 71 will be entrained in the air in said passage 38 and will be carried by said air into contact with the vanes 37, the wall 35 of the chamber 34 and associated elements to provide adequate lubrication of these parts.

As the air under pressure passes from the exit end of the channel 41 it will be forcibly impacted against the partition web 52; as a result of this impact, oil remaining entrained in the compressed air will gather on said partition web 52 and flow down the surface thereof to finally drip from said web 52 into the shallow basin constituting the inner surface of the bottom 46 of the oil and air separator 45. The air under pressure will be forced upwardly through the filtering material 56 in the auxiliary chamber 53 and will pass therefrom through the pipe 60 to the point of use. In its passage through the filtering material 56 the air will be subjected to the cleaning action thereof whereby any residue of oil still remaining in said air or any other impurities therein will be removed therefrom; as a result of these operations the air is thoroughly cleaned before it passes into and through the pipe 60 and accordingly is delivered to the point of use entirely free from oil or other harmful impurities.

As the precipitated oil gathers in the shallow basin formed on the inside surface of the bottom 46 of the oil and air separator 45, the oil will be absorbed by the wick 80 and delivered thereby to chamber 74 of the bracket 61; from the chamber 74 the oil from the end of the wick 80 will pass through the passage 73 to the opening 68 and from there will drip back to the supply 72 in the cup 66. The delivery of the oil by the wick 80 from the basin at the bottom of the oil and air separator 45 is effected by capillary action plus the pressure differential between said basin and the chamber 74; in this connection, it is to be noted that the aforesaid basin is on the pressure side of the apparatus while the chamber 74 is on the suction side thereof. The consequent pressure differential will develop a force within the tube 77 and throughout the wick 80 therein which co-operates with the capillary action of said wick to transfer the precipitated oil to the chamber 74 and especially in forcing such oil from the end of the wick 80 adjacent to said chamber 74 and returning it to the cup 66.

With the arrangement set forth, the wall 35 of the chamber 34, the vanes 37 and associated elements will be supplied with adequate lubrication but no excess, and thereby not only insure efficient operation of the mechanism but at the same time avoid entraining of excessive amounts of oil in the air as it passes through the pump.

As the oil reservoir is on the vacuum side of the pump, the oil in said reservoir is not subjected to pressure and as a result no objectionable churning or whirling of said oil develops at any time. In addition there is no sucking of oil in spite of the relatively high vacuum developed in the pump, this being due to the fact that there is no excessive lubrication on the suction side of the pump.

As is clearly shown in Fig. 3, the bearings for the shaft 17 and its extension 18 are located only in the motor section of the apparatus and not in the pump section thereof. This not only provides a compact arrangement but also avoids the necessity for belts, pulleys, gears, sprockets, stuffing boxes, guards, chains, drives, or the like, and reduces the construction to the point of maximum simplicity.

Various changes in the specific forms shown and described may be made within the scope of the claims without departing from the spirit of the invention.

I claim:

1. A pump comprising a housing provided with an interior circular chamber having an inlet and an outlet, a rotor rotatable within said chamber in eccentric relation thereto and provided with a plurality of open slots, vanes slidably mounted in said slots in engagement with the peripheral wall of said chamber, a bracket mounted on said housing, an oil reservoir depending from said bracket, the latter having a channel communicating with said inlet and said oil reservoir and being provided with a chamber communicating with said reservoir, a wick extending into the oil in said reservoir and through said channel with one end located in said inlet, an oil and air separator, a coupling tube connecting said oil and air separator with the outlet of said bracket chamber, a web in said oil and air separator in spaced relation to said coupling tube to constitute a baffle plate and forming an auxiliary chamber within said oil and air separator in communication with the interior thereof, filtering material within said auxiliary chamber, an outlet conduit leading from the upper end of said auxiliary chamber, a tube having its one end connected with said oil and air separator at the bottom thereof and its other end in communication with the chamber of said bracket, a second wick within said tube and having its one end portion within said oil and air separator on the bottom thereof, and terminating at its other end within the chamber of said bracket, and means for operating said rotor within said interior circular chamber.

2. A pump comprising a housing having an inlet and an outlet, a pumping unit operative within said housing to draw air through said inlet and expel it under pressure through said outlet, an oil and air separator having an inlet and an outlet, a connection between the inlet of said oil and air separator and the outlet of said housing, an oil reservoir, a connection between said reservoir and the inlet side of said housing, a wick dipping into the oil in said reservoir and having an end terminating in the inlet of said housing whereby oil is entrained in the air drawn through said inlet and carried through said housing for lubricating said pumping unit, a baffle plate within said oil and air separator in spaced opposition to the connection between the inlet of said oil and air separator and the outlet of said housing against which the oil entrained air is impacted to separate oil therefrom, filtering material within said oil and air separator between the inlet and outlet thereof for separating residue oil from said air subsequent to its impact with said baffle plate, a tube connecting said oil and air separator at the bottom with said oil reservoir, and a second wick extending through said tube from the interior of said oil and air separator into communicating relation with said oil reservoir whereby collected oil in said oil and air separator is returned to said reservoir.

3. A pump comprising a housing having an inlet and an outlet, a pumping unit operative within said housing to draw air through said inlet and expel it under pressure through said outlet, an oil and air separator having an inlet and an outlet, a connection between the inlet of said oil and air separator and the outlet of said housing, an oil reservoir, a connection between said reservoir and the inlet side of said housing, a wick dipping into the oil in said reservoir and extending through said connection and having an end terminating in the inlet of said housing whereby oil is entrained in the air drawn through said inlet and carried through said housing for lubricating said pumping unit, means within said oil and air separator for separating entrained oil from the air passing therethrough, the separated oil being collected on the bottom of said oil and air separator, and means including a second wick whereby collected oil in said oil and air separator is returned to said reservoir.

4. A pump comprising a housing having an inlet and an outlet, a pumping unit operative within said housing to draw air through said inlet and expel it under pressure through said outlet, an oil and air separator having an inlet and an outlet, a connection between the inlet of said oil and air separator and the outlet of said housing, an oil reservoir, a connection between said reservoir and the inlet side of said housing, lubricating means including a wick extending from the reservoir through said connection and terminating in said inlet for supplying lubricating oil to the air drawn through said inlet to lubricate said pumping unit, means in said oil and air separator for removing the oil from said air in its passage therethrough, and means having a delivery end subject to suction developed by said pumping unit for returning the collected oil from said oil and air separator to said oil reservoir.

5. A pump comprising a housing having an inlet and an outlet, a pumping unit operative within said housing to draw air through said inlet and expel it under pressure through said outlet, an oil and air separator having an inlet and an outlet, a connection between the inlet of said oil and air separator and the outlet of said housing, an oil reservoir, a connection between said reservoir and the inlet side of said housing, a wick extending from the reservoir through said connection and whereby oil is supplied by capillary attraction from said reservoir to said inlet for entraining in the air passing through the housing to thereby lubricate said pumping unit, means in said oil and air separator for removing entrained oil from said air, a second wick extending from the oil and air separator to the oil reservoir and having a delivery end subject to the pressure differential existing between the pressure and vacuum side of the pump, and an enclosing tube for said second wick whereby said pressure differential co-operates with the capillary action of said second wick to return collected oil from said oil and air separator to said oil reservoir.

6. The combination of a pump having an inlet through which fluid is drawn and an outlet through which said fluid is expelled under pressure, lubricating means effective in said inlet for supplying oil therein for entraining in the passing fluid and including an oil reservoir, an oil and air separator receiving the oil laden air from said pump and having an outlet, means in said oil and air separator for removing entrained oil from the fluid passing therethrough, a wick communicating with said oil and air separator and having its oil pick-up end extending therein and its delivery end located on the vacuum side of said pump in delivery relation to said oil reservoir whereby the pressure differential effective at said delivery end plus the capillary action of said wick returns collected oil from said oil and air separator to said oil reservoir, and a tube enclosing said wick.

7. The combination of a pump having an inlet through which fluid is drawn and an outlet through which said fluid is expelled under pressure, lubricating reservoir means effective in said inlet and subject to the pressure in said inlet for supplying oil therein for entraining in the passing fluid, enclosed means for removing entrained oil from said fluid subsequent to the lubricating action thereof and for collecting said removed oil, means including a wick having its oil pick-up end extending into said enclosed means and its delivery end subject to the pressure differential effective at the vacuum side of said pump whereby collected removed oil is returned from said oil removing means to said lubricating reservoir means and a tube enclosing said wick.

8. The combination of a pump having an inlet through which fluid is drawn and an outlet through which said fluid is expelled under pressure, lubricating means for supplying oil for entraining in the fluid drawn into the pump and including an oil reservoir subject to the fluid pressure in said inlet, an oil and air separator for removing entrained oil from the fluid expelled by said pump and for collecting the removed oil, a tube located exteriorly of said pump and leading from said oil and air separator to said oil reservoir, and a wick extending through said tube and projecting from the one end thereof into said oil and air separator and projecting into the oil reservoir at the other end of said tube whereby the collected oil is returned from said oil and air separator to said oil reservoir.

9. The combination of a pump having an inlet through which fluid is drawn and an outlet through which said fluid is expelled under pressure, an oil reservoir, a wick extending from said oil reservoir into the inlet of said pump for supplying oil for entraining in the fluid drawn into the pump, means for separating the entrained oil from the fluid expelled by said pump, a second wick for returning the separated oil from the separating means to the oil reservoir, and a tube enclosing said second wick.

SAMUEL SQUILLER.